United States Patent
Nakamura

(10) Patent No.: US 10,133,969 B1
(45) Date of Patent: Nov. 20, 2018

(54) IMAGE FORMING APPARATUS, CONTROL METHOD, AND STORAGE MEDIUM CONFIGURED TO FORM IMAGE LAYERS ON A FIRST RECORDING MEDIUM AND A SECOND RECORDING MEDIUM

(71) Applicant: CANON KABUSHIKI KAISHA, Tokyo (JP)

(72) Inventor: Sho Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/919,655

(22) Filed: Mar. 13, 2018

(30) Foreign Application Priority Data

Apr. 28, 2017 (JP) ................................. 2017-089518

(51) Int. Cl.
G06K 15/02 (2006.01)
H04N 1/00 (2006.01)
G03G 15/00 (2006.01)
G06F 3/12 (2006.01)

(52) U.S. Cl.
CPC ..... *G06K 15/1806* (2013.01); *G03G 15/6555* (2013.01); *G06F 3/1237* (2013.01); *H04N 1/0057* (2013.01)

(58) Field of Classification Search
USPC ........ 347/20, 44, 182; 355/407, 408, 26, 48; 358/1.1–3.29, 1.11–1.18, 498
See application file for complete search history.

(56) References Cited

U.S. PATENT DOCUMENTS

| 8,630,574 | B2 * | 1/2014 | Satomi | G03G 15/2064 |
| | | | | 399/341 |
| 2002/0037176 | A1 * | 3/2002 | Ogino | B32B 27/06 |
| | | | | 399/68 |
| 2007/0284047 | A1 * | 12/2007 | Preisner | B41F 19/062 |
| | | | | 156/387 |
| 2009/0322814 | A1 * | 12/2009 | Sano | B41J 2/2114 |
| | | | | 347/12 |
| 2016/0103410 | A1 * | 4/2016 | Yamamoto | G03G 15/6564 |
| | | | | 399/388 |
| 2017/0120654 | A1 * | 5/2017 | Kobayashi | B41M 7/0027 |

FOREIGN PATENT DOCUMENTS

JP 2012003252 A 1/2012

* cited by examiner

*Primary Examiner* — Marcellus Augustin
(74) *Attorney, Agent, or Firm* — Canon U.S.A., Inc. IP Division

(57) ABSTRACT

An image forming apparatus to form image layers on a first recording medium and a second recording medium, and including a reception unit that receives a print job, a conveyance unit, an image forming unit, a re-conveyance unit, and a discharge unit. The conveyance unit sequentially conveys recording media to a recording position used to form an image layer on a recording medium. Each time a recording medium is conveyed to the recording position, the image forming unit forms one image layer on the conveyed recording medium based on the print job. The re-conveyance unit re-conveys the same recording media to the recording position. The second recording medium is conveyed to the recording position prior to the first recording medium unless the second recording medium and the first recording media are to receive the same number of image layers. Then, the first recording medium is conveyed to the recording position.

18 Claims, 9 Drawing Sheets

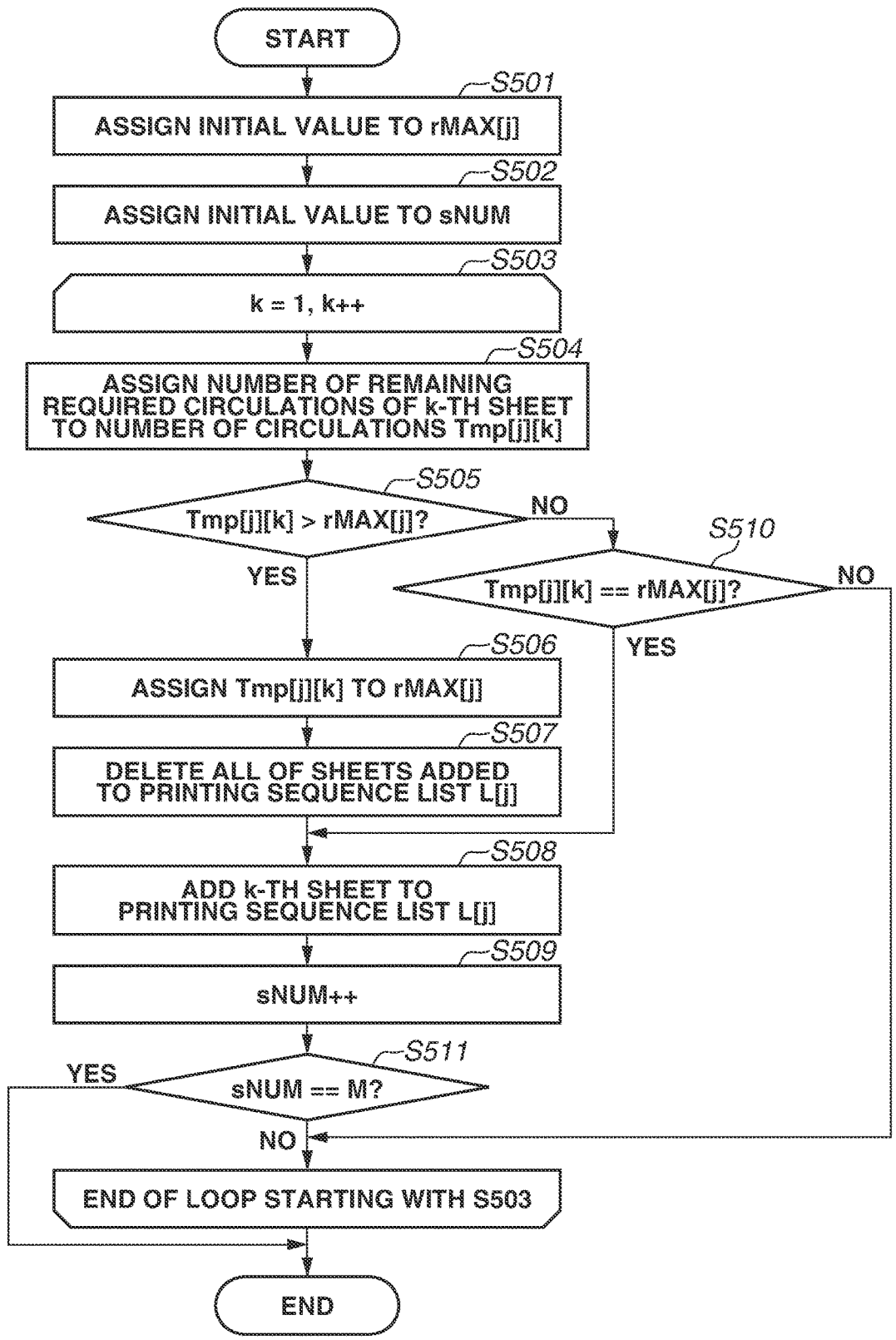

FIG.8

| LENGTH (cm) OF CONVEYANCE ROUTE | 100 |
|---|---|

| PAPER SIZE | LENGTH (cm) OF SHEET OF PAPER IN CONVEYANCE DIRECTION | NUMBER OF SHEETS ABLE TO BE CIRCULATED (SHEETS) |
|---|---|---|
| A4 (PORTRAIT) | 29.7 | 3 |
| A4 (LANDSCAPE) | 21.0 | 4 |
| A3 | 29.7 | 3 |

IMAGE FORMING APPARATUS, CONTROL METHOD, AND STORAGE MEDIUM CONFIGURED TO FORM IMAGE LAYERS ON A FIRST RECORDING MEDIUM AND A SECOND RECORDING MEDIUM

BACKGROUND OF THE INVENTION

Field of the Invention

Aspects of the present disclosure generally relate to an image forming apparatus, a control method, and a storage medium.

Description of the Related Art

There is known a method of forming a plurality of image layers on a recording medium.

Japanese Patent Application Laid-Open No. 2012-3252 discusses a technique of executing two-sided printing (duplex printing), which forms one image layer on each of both surfaces of a recording medium, and one-side printing (simplex printing), which forms one image layer on one surface of a recording medium. According to the technique discussed in Japanese Patent Application Laid-Open No. 2012-3252, in a case where a recording medium subjected to two-sided printing is discharged after a recording medium subjected to one-side printing, printing is performed on the first surface of a recording medium to be subjected to two-sided printing prior to a recording medium to be subjected to one-side printing. With this, the technique discussed in Japanese Patent Application Laid-Open No. 2012-3252 executes one-sided printing while effectively utilizing a time required to re-convey a recording medium with printing completed on the first surface to perform printing on the second surface thereof, thus reducing a required printing time while keeping the sequence of discharging of recording media.

Furthermore, in recent years, for example, to provide printed products directed to print-on-demand (POD) markets, image forming apparatuses which execute printing on a plurality of recording media including a recording medium on which three or more image layers are formed have been in widespread use. Therefore, appropriately executing printing on a plurality of recording media including a recording medium on which three or more image layers are formed is being demanded more than ever before.

SUMMARY OF THE INVENTION

Aspects of the present disclosure are generally directed to appropriately executing printing on a plurality of recording media including a recording medium on which three or more image layers are formed.

According to an aspect of the present invention, an image forming apparatus to form one or a plurality of image layers on a plurality of recording media including a first recording medium on which a first number of image layers are formed and a second recording medium on which a second number of image layers are formed, wherein the second number is larger than the first number by two or more, includes a reception unit configured to receive a print job, a conveyance unit configured to sequentially convey recording media included in the plurality of recording media to a recording position used to form an image layer on a recording medium, an image forming unit configured to form, each time a recording medium is conveyed to the recording position, one image layer on the recording medium conveyed to the recording position based on the print job, a re-conveyance unit configured to re-convey, to the recording position, a recording medium having one or a plurality of image layers formed on the re-conveyed recording medium, and a discharge unit configured to discharge, to a discharge destination in a sequence of discharging that is based on one or a plurality of print jobs each corresponding to the print job, a recording medium or media having an image layer or layers completely formed on the media, wherein, regardless of the sequence of discharging, the second recording medium is conveyed to the recording position prior to the first recording medium, and wherein, in a case where a number of remaining image layers to be formed on the second recording medium having one or more image layers already formed on the second recording medium and a number of remaining image layers to be formed on the first recording medium having no image layer yet formed on the first recording medium are equal to each other, the first recording medium is conveyed to the recording position.

Further features of the present invention will become apparent from the following description of embodiments with reference to the attached drawings.

BRIEF DESCRIPTION OF THE DRAWINGS

FIG. 5 is a flowchart illustrating processing which the image forming apparatus performs to determine a sequence of printing on sheets to be subjected to printing based on an input print job.

FIG. 8 is a diagram illustrating the number of sheets M that are able to be concurrently circulated on a circulation route.

DESCRIPTION OF THE EMBODIMENTS

Figure 1:
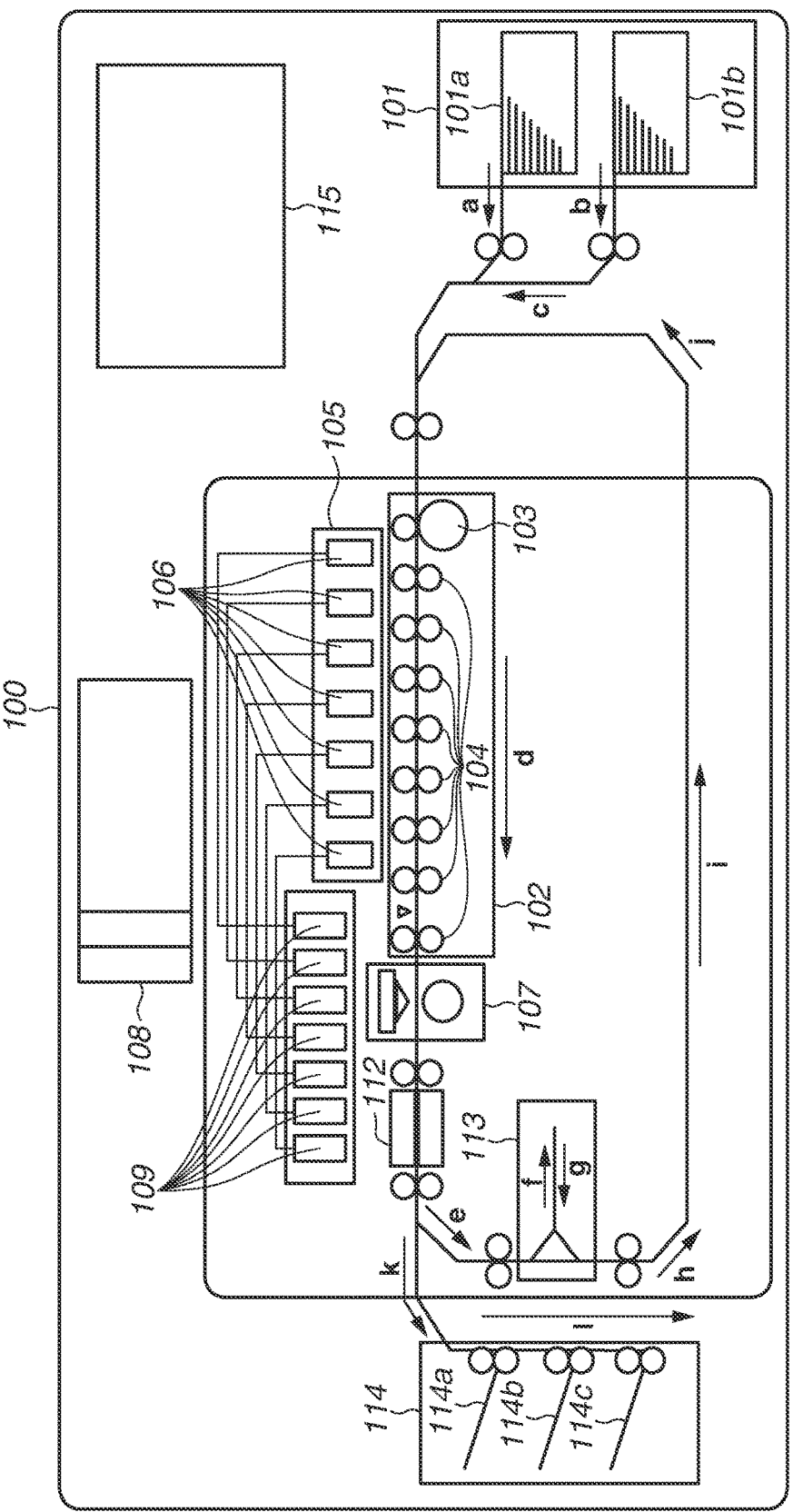
FIG. 1 is a sectional view illustrating an outline of an overall configuration of an image forming apparatus.

Various embodiments, features, and aspects will be described in detail below with reference to the drawings. In this regard, however, it should be understood that embodiments obtained by appropriately altering, modifying, or improving embodiments described below based on the knowledge of a person ordinarily skilled in the art within a range not exceeding the gist of the disclosure are also encompassed in the scope of the disclosure.

An outline configuration of an image forming apparatus is described. In the present embodiment, an inkjet-type printer is taken as an example of the image forming apparatus. The image forming apparatus in the present embodiment includes a printing function as an image forming function, but can further include another function such as a scanning function, which scans an original to generate image data. Moreover, while the image forming apparatus in the present embodiment performs print processing using cut sheets (sheets of paper uniformly cut to a predetermined size, such as A3 or A4), the present embodiment is not limited to this configuration, but the image forming apparatus can perform print processing using a continuous sheet such a roll paper sheet. Furthermore, the printing type of the image forming apparatus in the present embodiment is not limited to an inkjet type, but can be another printing type, such as an electrophotographic type or a sublimation type. Additionally, the image forming apparatus is not limited to the one which performs color recording using a plurality of color recording agents, but can be the one which performs monochromatic recording using only a black (including gray) recording agent. Furthermore, the print processing to be performed by the image forming apparatus is not limited to print processing for a visible image, but can be processing for printing an invisible image or an image unlikely to be viewable. Moreover, the print processing can be processing for printing, besides ordinary images, various things, such as a wiring (interconnection) pattern, a physical pattern in the manufacture of components, and a DNA base sequence. In other words, the image forming apparatus can perform any type of print processing as long as it is processing for applying a recording agent to a recording medium. Furthermore, a recording medium which is used for print processing which the image forming apparatus in the present embodiment performs is not limited to the above-mentioned sheet, but various media can be used. For example, plain paper, photo paper, overhead projector (OHP) sheets, transparent films, special paper of metallic color with bonded aluminum films, acrylic plates, and cardboard can be used. Moreover, a recording agent which is used for print processing which the image forming apparatus in the present embodiment performs is not limited to liquid ink, but various agents can be used according to a printing type to be employed. For example, in the image forming apparatus in the present embodiment, solid ink or toner can be used.

FIG. 1 is a sectional view illustrating an outline of an overall configuration of an image forming apparatus in the present embodiment.

An image forming apparatus 100 is the image forming apparatus in the present embodiment. The image forming apparatus 100 includes the following constituent elements 101 to 115. Furthermore, while the constituent elements are arranged inside a single housing, the present embodiment is not limited to this configuration, but the constituent elements can be divisionally arranged in a plurality of housings. Hereinafter, details of the constituent elements are described.

A control unit 108 contains a control section including a controller (including a central processing unit (CPU) or a microprocessing unit (MPU)), an output device for user interface information (for example, a generator for display information or acoustic information), and various input-output (I/O) interfaces, and manages various control operations for the entirety of the image forming apparatus 100.

A sheet feeding cassette unit 101 includes an upper-stage cassette 101a and a lower-stage cassette 101b, each of which serves as a retention unit which retains recording media. Since sheets adaptable to a print job are set in the sheet feeding cassette unit 101, the image forming apparatus 100 is able to start printing without receiving supply of sheets for each printing operation. A sheet pulled out from the upper-stage cassette 101a is conveyed in the direction of arrow "a" illustrated in FIG. 1, and a sheet pulled out from the lower-stage cassette 101b is conveyed in the direction of arrow "b" illustrated in FIG. 1. After that, a sheet pulled out from any cassette advances in the direction of arrow "c" illustrated in FIG. 1, and then arrives at a conveyance unit 102. The conveyance unit 102 conveys the sheet in the direction of arrow "d" illustrated in FIG. 1 (in an approximately horizontal direction) during print processing via a plurality of rotary rollers 104. Furthermore, the sheet cassettes included in the sheet feeding cassette unit 101 are not limited two cassettes, but can be one cassette or three or more cassettes.

A head unit 105 is located above the conveyance unit 102 while facing the conveyance unit 102. The head unit 105 includes a plurality of print heads 106 individually provided respectively for a plurality of colors (in the present embodiment, seven colors) and held along the sheet conveyance direction. In the present embodiment, the image forming apparatus 100 includes seven print heads corresponding to seven color inks of cyan (C), magenta (M), yellow (Y), light magenta (LM), gray (G), black (B), and white (W). Naturally, the image forming apparatus 100 can include print heads corresponding to color inks other than the above-mentioned seven color inks, such as transparent (clear) and light cyan (LC) inks, or print heads corresponding to special inks of metallic system, such as gold and silver inks, and does not need to use all of such inks.

The image forming apparatus 100 causes the print heads 106 to eject inks in synchronization with a sheet being conveyed by the conveyance unit 102. With this, the image forming apparatus 100 forms an image on a sheet present at a recording position, which is a position facing the print heads 106, based on a print job. Furthermore, the print heads 106 are arranged in such a manner that ejection destinations of inks do not overlap the rotary rollers 104. Furthermore, the image forming apparatus 100 can be configured to form an image by causing inks to be directly ejected onto a sheet or can be configured to form an image by applying inks to an intermediate transfer member and then transferring the inks applied to the intermediate transfer member onto a sheet. A printing unit is thus configured with the conveyance unit 102, the head unit 105, and the print heads 106. Ink tanks 109 independently store respective color inks. Inks stored in the ink tanks 109 are supplied to sub-tanks provided in association with the respective colors via tubes connected to the ink tanks 109, and the inks supplied to the sub-tanks are then supplied to the respective print heads 106 via tubes. Line heads for the respective colors of the print heads 106 are arranged side by side along the direction of arrow "d", which is the sheet conveyance direction during printing. The line head for each color can be a head formed from a single nozzle chip having no seams, or can be a head in which divided nozzle chips are arranged side by side in a regular manner, such as in a line or in a staggered arrangement. In the image forming apparatus 100 in the present embodiment, each print head 106 is assumed to be a full multi-head in which nozzles are arranged side by side in a range that covers the width of a printable area of the maximum-size sheet which the image forming apparatus 100 is able to use. Moreover, the method in which the image forming apparatus 100 ejects inks from the nozzles can be various methods, such as a method of using heating elements, a method of using piezoelectric elements, a method of using electrostatic elements, and a method of using microelectromechanical system (MEMS) elements. Furthermore, timing of ejection of inks in print processing is determined according to an output signal from a conveyance encoder 103.

After an image is formed on a sheet, the sheet is conveyed from the conveyance unit 102 to a scanner unit 107. The scanner unit 107 optically reads an image or a special pattern on the conveyed sheet to check for the success or failure of printing or check for the status of the image forming apparatus 100, such as the state of ejection of ink. Furthermore, the scanner unit 107 can read a predetermined pattern to check for the state of ejection of ink, or can compare the read image with image data that is based on a print job to check for the success or failure of printing. In this way, checking performed by the scanner unit 107 can be performed based on various methods.

The sheet conveyed to the scanner unit 107 is then conveyed to a drying unit 112. The drying unit 112 is a unit which heats a sheet passing through the unit with warm air (warmed gas (air)) to dry ink applied to the sheet in a short amount of time. Furthermore, as the method for drying, instead of a method of using warm air, various methods, such as a method of using cold air, a method of performing warming with a heater, a method of holding the sheet for natural drying, and a method of using an electromagnetic wave such as ultraviolet light, can be employed. Sheets pass through the inside of the drying unit 112 one by one, and are conveyed in the direction of arrow "e" illustrated in FIG. 1 and then conveyed to an inversion unit 113, or are conveyed in the direction of arrow "k" illustrated in FIG. 1 and then conveyed to a sorting unit 114. Furthermore, whether a sheet is conveyed to the inversion unit 113 or is conveyed to the sorting unit 114 is determined according to whether to perform printing in succession on the sheet being conveyed. In the present embodiment, as successive printing on the sheet being conveyed, printing can be further performed on a surface with printing already performed thereon, or printing can be performed on a surface opposite to the surface with printing already performed thereon.

The inversion unit 113 conveys a sheet in such a manner that the front and back surfaces of the sheet passing through the inversion unit 113 are inverted. Furthermore, at this time, in a case where the sheet being conveyed is a sheet in which printing is further performed on the surface with printing already performed thereon, the inversion unit 113 conveys the sheet without inverting the front and back surfaces of the sheet. The method of inverting a sheet includes, for example, a "switch back method", which is able to invert a sheet by a simple configuration, and a "method of moderately twisting a conveyance route", which is able to keep the conveyance speed of a sheet constant. In the present embodiment, in the case of inverting a sheet, the image forming apparatus 100 employs the switch back method, which switches the direction of movement of the sheet in such a manner that the sheet conveyed to the inversion unit 113 advances in the direction of arrow "f" illustrated in FIG. 1 inside the inversion unit 113 and is then conveyed in the direction of arrow "g" illustrated in FIG. 1, which is opposite to the direction of arrow "f". In a case where a sheet is inverted, at a point of time when the sheet passes through the inversion unit 113 and is then conveyed in the direction of arrow "h" illustrated in FIG. 1, the sheet being conveyed is in a state in which the front and back surfaces thereof have been inverted.

The sheet conveyed from the inversion unit 113 is conveyed in the direction of arrow "h", the direction of arrow "i", and the direction of arrow "j" illustrated in FIG. 1 inside the image forming apparatus 100 and is then returned to the conveyance unit 102, so that image formation is re-performed on the sheet. Furthermore, in a case where the sheet is returned to the conveyance unit 102 for a reason of, for example, control of the sequence of discharging to the sorting unit 114, image formation does not need to be performed on the sheet.

The sorting unit 114 includes a plurality of trays (trays 114a to 114c) mounted as discharge destinations of recording media with formation of image layers thereon completed, and tray numbers are assigned to the respective trays. The sorting unit 114 discharges a sheet passing through the sorting unit 114 in the direction of arrow "1" illustrated in FIG. 1 to a tray. The tray serving as a discharge destination of the sheet is determined according to setting of a print job corresponding to printing performed on the sheet to be discharged. Furthermore, the present embodiment is not limited to this configuration, but, for example, the tray serving as a discharge destination of a sheet can be determined according to a user operation performed at an issuance source of a print job (a host device) or can be determined by the image forming apparatus 100 according to which tray is empty. Furthermore, the sorting unit 114 is able to discharge up to a predetermined number of sheets to one tray. In a case where the number of sheets subjected to printing by one print job exceeds the predetermined number of sheets, those sheets are discharged to a plurality of trays in a distributed manner. Moreover, for example, the number, size, or type of sheets able to be discharged to a tray can vary according to, for example, the size (type) of the tray. Moreover, the sorting unit 114 issues a notification about the status of each tray indicating, for example, that sheets are being discharged, that discharging of sheets is completed, and that no empty tray is present, in a manner recognizable by the user with a display device. At this time, the sorting unit 114 issues a notification to the user about the various statuses of each tray using the colors, lighting state, or blinking state of a plurality of light-emitting diodes (LEDs), which is mounted at the respective trays and is able to perform light emission in respective different colors.

An operation unit 115 is used for the user to perform various operations and is configured to notify the user of various pieces of information. The operation unit 115 notifies the user of a printing status for every print job, indicating, for example, to which tray a sheet on which an image designated by the user has been printed has been discharged or whether printing of the image is in progress or is complete. Moreover, the operation unit 115 notifies the user of various states of the image forming apparatus 100, such as the states of the amount of remaining ink and the amount of remaining sheets or an error state. Additionally, the user is allowed to use the operation unit 115 to issue an instruction for executing the apparatus maintenance, such as head cleaning, and to issue an instruction for print processing.

Furthermore, in the present embodiment, the conveyance route for moving in the directions of arrows "d", "e", "f", "g", "h", "i", and "j" illustrated in FIG. 1 and for re-conveying a sheet to the recording position is referred to as a "circulation route".

Figure 2:
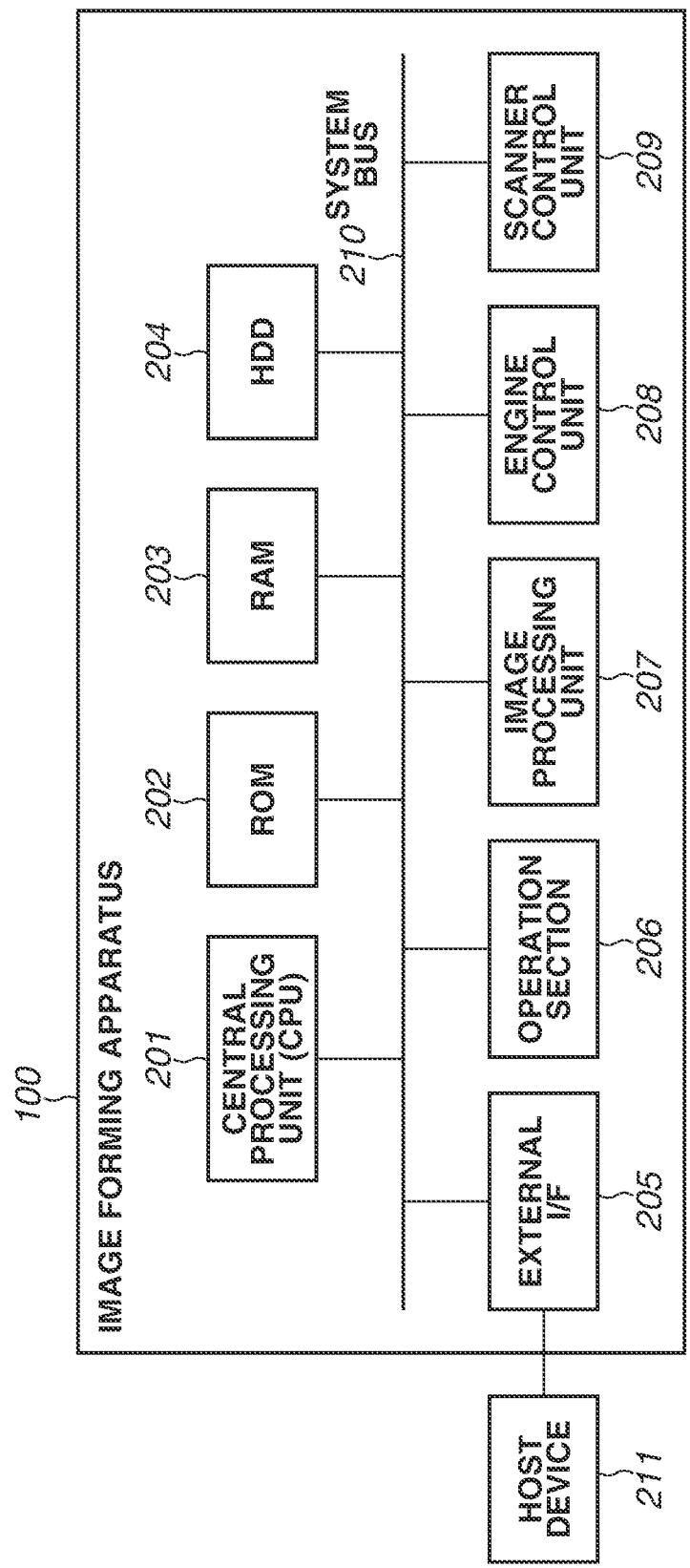
FIG. 2 is a block diagram illustrating an outline configuration of the image forming apparatus.

FIG. 2 is a block diagram illustrating an outline configuration of the image forming apparatus 100. A CPU 201, a read-only memory (ROM) 202, a random access memory (RAM) 203, an image processing unit 207, an engine control unit 208, and a scanner control unit 209 correspond to the control unit 108. Then, for example, a hard disk drive (HDD) 204, an operation section 206, and an external interface (I/F)

205 are connected to those components corresponding to the control unit 108 via a system bus 210.

The CPU 201, which is a central processing unit in the form of a microprocessor (microcomputer), controls operations of the entire image forming apparatus 100 by executing various programs and activating hardware.

The ROM 202 stores various programs, such as control programs and an embedded operating system (hereinafter referred to as an "OS"), which the CPU 201 executes. In the present embodiment, the control programs stored in the ROM 202 are used to perform software control, such as scheduling and task switching, under the management of the embedded OS stored in the ROM 202.

The RAM 203, which is configured with a memory such as a static RAM (SRAM), stores, for example, program control variables, setting values registered by the user, and setting information such as management data about the image forming apparatus 100. Furthermore, these pieces of data can be stored not in the RAM 203 but in another storage region, such as the ROM 202 or the HDD 204. Moreover, the RAM 203 is used as a work area for the CPU 201 or is used as a region in which various pieces of received data are temporarily stored.

The HDD 204 stores in a hard disk incorporated therein or reads out from the hard disk the control programs which the CPU 201 executes, print data, and setting information required for various operations of the image forming apparatus 100. Moreover, upon receiving a print job, the CPU 201 sets an identifier (ID) able to identify the received print job to a job key stored in the HDD 204, thus managing a printing sequence. Furthermore, instead of the HDD 204, another large-capacity storage device can be used, and information to be stored in the HDD 204 can be stored in another storage region, such as the ROM 202 or the RAM 203, instead.

The operation section 206 includes hardware keys or a touch panel used for the user to perform various operations and a display unit for presenting (notifying the user) various pieces of information to the user, and corresponds to the operation unit 115 illustrated in FIG. 1. Moreover, presentation of information to the user can be performed by outputting sounds (for example, buzzer or voice) that are based on acoustic information produced by an audio generator.

The image processing unit 207 performs image processing on data received from a host device 211. For example, the image processing unit 207 converts red, green, and blue (RGB) values included in a print job received from the host device 211 into cyan, magenta, yellow, and key (black) (CMYK) values. Moreover, the image processing unit 207 applies various image processing operations, such as resolution conversion into the number of effective pixels (able to be processed by the image forming apparatus 100), image analysis, and image correction, to data included in the print job. Print data obtained by these image processing operations is then stored in the RAM 203 or the HDD 204.

The engine control unit 208 performs control of processing (print processing) for printing on a sheet an image that is based on print data subjected to image processing by the image processing unit 207, according to a control command received from, for example, the CPU 201. For example, the engine control unit 208 performs, for example, an instruction for ink ejection to the print heads 106 for respective colors, setting of ejection timing for adjusting dot positions (ink impact positions) on a sheet, and adjustment that is based on the acquisition of a head driving state. Furthermore, the engine control unit 208 performs drive control of the print heads 106 based on print data, thus causing the print heads 106 to eject ink to form an image on a sheet. Moreover, the engine control unit 208 performs control of conveyance rollers, such as an instruction for driving sheet feeding rollers, an instruction for driving conveyance rollers, and acquisition of a rotation status of conveyance rollers, thus conveying a sheet at an appropriate speed and in an appropriate route and then stopping the sheet. Additionally, at this time, the engine control unit 208 controls the order of print data to be printed, based on a printing sequence list, which is described below.

The scanner control unit 209 determines whether an image formed on a sheet is a correctly printed image. First, the scanner control unit 209 issues an instruction for driving an image sensor (a charge-coupled device (CCD) image sensor or a complementary metal-oxide semiconductor (CMOS) image sensor) to read an image on the sheet, according to a control command received from, for example, the CPU 201. Specifically, the scanner control unit 209 acquires, from the image sensor, analog luminance data for red (R), green (G), and blue (B) about an image on the sheet, and converts the analog luminance data into digital data. At this time, the image sensor can be a linear image sensor or an area image sensor. After that, the scanner control unit 209 analyzes luminance data acquired from the image sensor to detect, for example, any non-ejection state of ink in the print heads 106 or a cutting position of the sheet, thus determining whether an image formed on the sheet is a correctly printed image. Furthermore, a sheet about which it has been determined by the scanner control unit 209 that an image on the sheet is a correctly printed image is then subjected to drying treatment of a recording agent on the sheet, and is then discharged to a designated tray of the sorting unit 114.

The external I/F 205 is a user interface used to receive, for example, image data, other commands, and status signals from the host device 211. The external I/F 205 can be a local I/F or a network I/F. Moreover, communications of the external I/F 205 with the host device 211 can be communications performed in a direct manner by wireless communication or communications performed via an external access point located on a wired network. The communication method to be used includes, for example, Wi-Fi® (Wireless Fidelity) and NFC (Near Field Communication standardized in International Organization for Standardization (ISO) and the International Electrotechnical Commission (IEC) ISO/IEC 18092).

The above-mentioned components included in the image forming apparatus 100 are interconnected via the system bus 210 and are able to communicate with each other.

Furthermore, while, in the above-mentioned example, a single CPU 201 controls all of the constituent elements included in the image forming apparatus 100 illustrated in FIG. 2, a configuration other than this can be employed. For example, some of the functional blocks can separately include CPUs and the CPUs can individually perform control. Moreover, various configurations, such as a configuration in which the functional blocks are appropriately divided as individual processing units or control units according to a manner of sharing other than that of the configuration illustrated in FIG. 2 and a configuration in which some of the functional blocks are integrated, can be employed. Additionally, readout of data from a memory can be performed with use of a direct memory access controller (DMAC).

The host device 211, which is connected to the image forming apparatus 100, is an apparatus that supplies print data or image data to the image forming apparatus 100. In the present embodiment, when causing the image forming apparatus 100 to perform printing based on print data, the host device 211 issue a print job including the print data or image data serving as a source of the print data to the image forming apparatus 100. Furthermore, the host device 211 only needs to be an apparatus serving as a supply source of print data or image data, and is an apparatus such as a portable terminal, a personal computer (PC), a tablet terminal, a personal digital assistant (PDA), or a digital camera. Moreover, the host device 211 can be an apparatus that captures an image to generate image data, such as a reader (scanner), which reads an image on an original to generate image data, or a film scanner, which reads a negative film or positive film to generate image data. Moreover, the host device 211 can be an apparatus that provides a photo storage on a network or is equipped with a socket used to insert a removable portable memory and that reads out an image file stored in the photo storage or the portable memory to generate image data. Additionally, the host device 211 can be configured as a constituent element of the image forming apparatus 100. Furthermore, in a case where the host device 211 is configured as a PC, an OS, application software for generating image data, and a printer driver for the image forming apparatus 100 are installed on a storage device of the PC. The printer driver controls the image forming apparatus 100, and generates print data by converting image data supplied from the application software (for example, data expressed by a page-description language) into a format able to be handled by the image forming apparatus 100. In the present embodiment, it is supposed that, after conversion from image data to print data is performed by the host device 211, the print data is supplied to the image forming apparatus 100. However, to cause conversion from image data to print data to be performed by the image forming apparatus 100, the image data can be supplied to the image forming apparatus 100.

Furthermore, implementing all of the above-mentioned processing operations by software is not essential, but a part or the whole of the processing operations can be implemented by hardware.

Figure 3A:
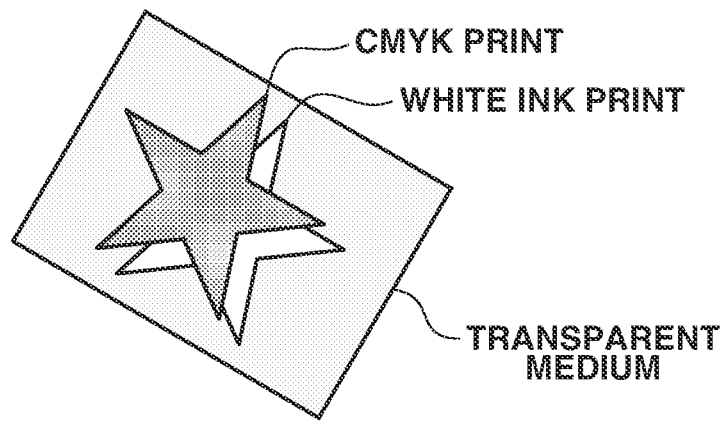
FIGS. 3A, 3B, and 3C are diagrams illustrating printed products each with a plurality of image layers formed thereon.
Figure 3B:
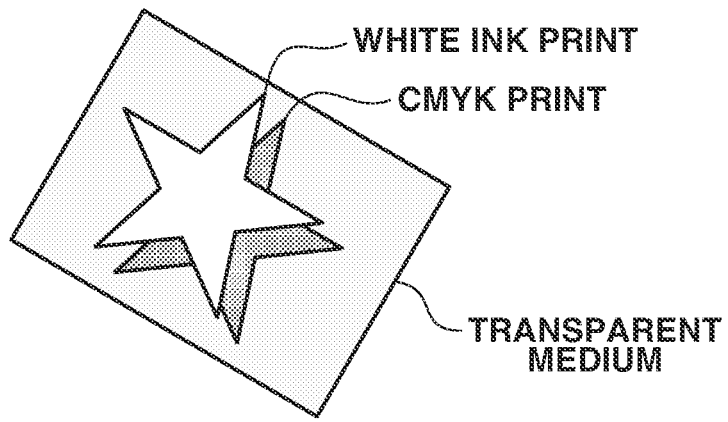
Figure 3C:
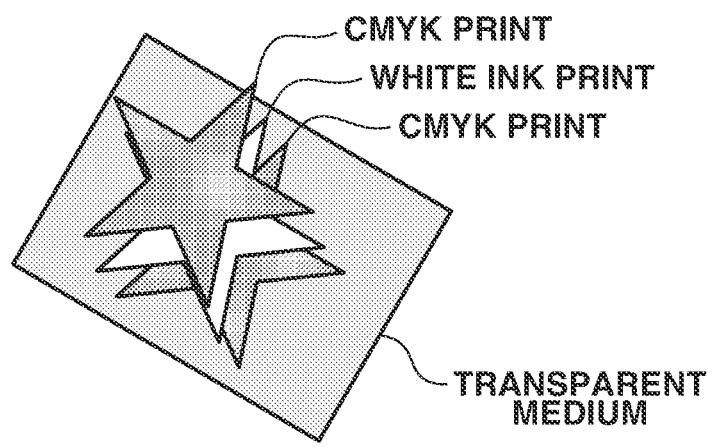

FIGS. 3A, 3B, and 3C are diagrams illustrating printed products each having a plurality of image layers formed thereon. An example in which a plurality of image layers is printed on one sheet in a superposed manner is described with reference to FIGS. 3A to 3C. The example in which a plurality of image layers is printed on one sheet in a superposed manner includes, for example, an example in which a transparent medium is used as a sheet. In a case where printing is performed by directly applying CMYK ink to a transparent medium, a portion having CMYK ink applied thereto may become see-through due to light passing through the transparent medium, so that the coloring property of a printed product may sometimes become worse. To prevent this, as illustrated in FIG. 3A, first, printing is performed on a transparent medium with use of white ink to form a background base, and, then, printing with use of CMYK ink is performed on the background base printed with white ink. With this configuration employed, the coloring property of a printed product can be refined. Moreover, as illustrated in FIG. 3B, after printing is performed on a transparent medium with use of CMYK ink, printing with use of white ink is performed on a portion printed with CMYK ink. This configuration is used for printed products in which a design printed with use of CMYK ink is designed to be viewed from a surface opposite to the surface with ink applied thereto. Furthermore, as illustrated in FIG. 3C, after printing is performed on a transparent medium with use of CMYK ink, printing with use of white ink is performed on a portion printed with CMYK ink, and, then, printing with use of CMYK ink is performed on the portion printed with CMYK ink and white ink. This configuration allows a printed design to be able to be viewed from both sides of a transparent medium.

Moreover, besides white ink, metallic special ink such as gold or silver ink may be used for printing on a background base. Printing on a background base using metallic ink allows exhibiting a deep color tone as compared with printing using only CMYK ink. On the other hand, printing a metallic image layer on a CMYK image layer in a superposed manner allows making a printed product exhibiting a metallic gloss feeling.

When performing printing in which a plurality of image layers is formed in a superposed manner on a single sheet as mentioned above, the image forming apparatus 100 may perform printing while cyclically conveying a sheet targeted for printing in such a manner that the sheet passes through the same route a plurality of times.

For example, there is a case where an image forming apparatus 100 equipped with a head unit 105 in which print heads corresponding to white ink are arranged side by side behind print heads corresponding to respective CMYK colors outputs a printed product with an image layer formed with white ink as illustrated in FIG. 3A. In this case, at a point of time when printing using white ink ends, a sheet targeted for printing has already passed over a position at which printing using CMYK ink is to be performed. Therefore, to perform using CMYK ink on a background base printed with white ink, the image forming apparatus 100 re-conveys the sheet to the position at which printing using CMYK ink is to be performed. In other words, the image forming apparatus 100 conveys the sheet in such a manner that the sheet passes two times through the route in which the sheet is conveyed by the conveyance unit 102.

Furthermore, if, regardless of an alignment sequence of print heads in the head unit 105, for example, printing using CMYK ink is performed immediately after printing using white ink, printing would be executed with water of white ink remaining. In this case, white ink and CMYK ink would intermix, so that the coloring property of a printed product may decrease. To avoid this, after performing printing using white ink, the image forming apparatus 100 dries white ink via the drying unit 112 to form a white image layer and then cyclically conveys the sheet to perform printing using CMYK ink (formation of an image layer with CMYK ink).

However, in a case where printing is performed on a group of sheets including a sheet on which a plurality of image layers is formed in a superposed manner, as mentioned above, the following issues may arise. For example, there is a configuration in which, after all of the sheets to be used for performing printing based on a print job are supplied to the circulation route, the sheets are cyclically conveyed a plurality of times, so that a plurality of image layers is formed on the sheets. In this configuration, in a state where printing on a sheet on which a small number of image layers are to be printed is completed but printing on a sheet on which a large number of image layers are to be printed is not completed, the sheet on which a small number of image layers are to be printed may be cyclically conveyed regardless of the fact that printing thereon is completed. Thus, since the sheet passes through the drying unit 112 regardless of completion of printing thereon, an issue arises in that the sheet may be greatly affected by drying. Moreover, in a configuration in which, after all of the sheets to be used for performing printing based on a print job are supplied to the circulation route, a sheet is discharged to a discharge destination as soon as printing thereon is completed, an issue arises in that, depending on the number of image layers to be formed on a sheet, a sequence of discharging of sheets may be changed.

Therefore, the image forming apparatus 100 according to the present embodiment performs printing without a sequence of discharging of sheets being changed and without wastefully cyclically conveying a sheet with printing thereon completed.

Figure 4:
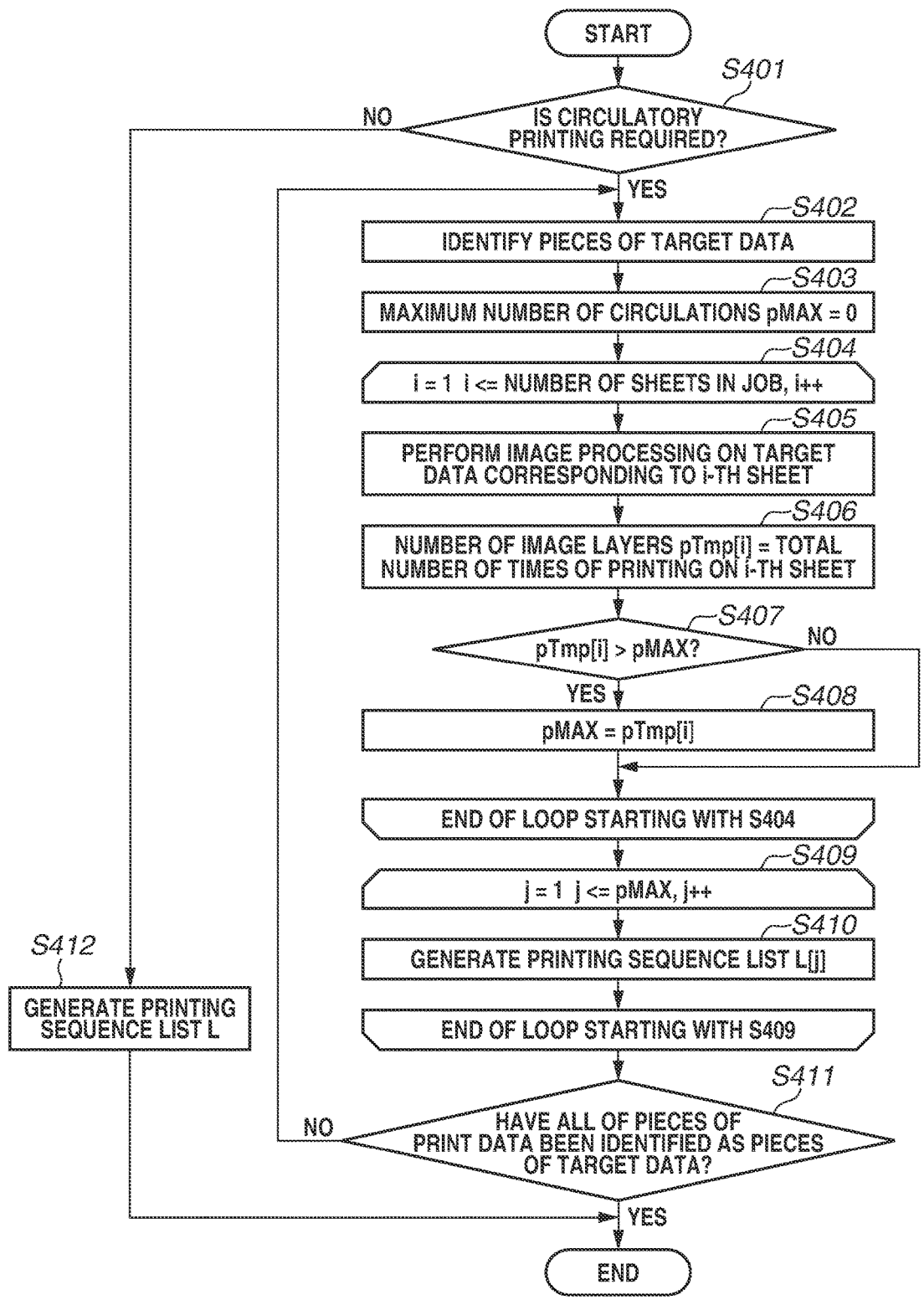
FIG. 4 is a flowchart illustrating processing which the image forming apparatus performs when receiving a print job.

FIG. 4 is a flowchart illustrating processing which the image forming apparatus 100 performs when receiving a print job. Furthermore, the processing illustrated in this flowchart is implemented by the CPU 201 loading a control program stored in, for example, the ROM 202 or the HDD 204 included in the image forming apparatus 100 onto the RAM 203 and executing the control program. The processing illustrated in this flowchart is assumed to be started when a print job is input to the image forming apparatus 100.

First, in step S401, the CPU 201 determines whether circulatory printing is required in printing that is based on the input print job. Specifically, the CPU 201 determines whether the maximum number of image layers among the numbers of image layers to be formed on sheets on which printing is to be performed based on the input print job is 2 or more. When determining that the maximum number of image layers is 2 or more so that circulatory printing is required (YES in step S401), the CPU 201 advances the processing to step S402, and, when determining that the maximum number of image layers is not 2 or more (in other words, is 1) so that circulatory printing is not required (NO in step S401), the CPU 201 advances the processing to step S412.

In step S402, the CPU 201 identifies pieces of print data serving as targets for generation processing of a printing sequence list L (hereinafter referred to as pieces of target data) from pieces of print data that are based on the input print job. In the present embodiment, one piece of print data is assumed to be used for printing on one sheet. Moreover, one or a plurality of pieces of print data is assumed to be included in one print job. Furthermore, in the present embodiment, the maximum number of pieces of target data to be identified at a time is assumed to be equal to the number of sheets M that are able to be concurrently circulated on the circulation route. In other words, the CPU 201 identifies, as pieces of target data, M pieces of print data that are smaller in sheet number from among pieces of print data that are not yet identified as pieces of target data. The sheet number is a number which is set based on a print job, and is equivalent to a page number. Furthermore, in a case where the number of pieces of print data that are not yet identified as pieces of target data is M or less, the CPU 201 identifies, as pieces of target data, all of the pieces of print data that are not yet identified as pieces of target data.

FIG. 8 is a diagram illustrating the number of sheets M that are able to be concurrently circulated on the circulation route. While, in the present embodiment, the length of the circulation route is set to 100 cm, the present embodiment is not limited to this. The CPU 201 determines the number of sheets M based on the length of the circulation route and the length in the conveyance direction of a sheet to be supplied to the circulation route. While, in the present embodiment, A4 (portrait), A4 (landscape), and A3 are shown as paper sizes, sheets of paper with sizes other than those sizes can be used. The lengths in the conveyance direction of sheets of paper A4 (portrait), A4 (landscape), and A3 are 29.7 cm, 21.0 cm, and 29.7 cm, respectively. The number of sheets M is calculated by the following equation.

Number of sheets $M$=Length of circulation route÷Length of sheet of paper in conveyance direction As illustrated in FIG. 8, the number of sheets M is 3 in a case where the paper size is A4 (portrait), is 4 in a case where the paper size is A4 (landscape), and is 3 in a case where the paper size is A3. While, in the present embodiment, a case where the paper sizes of all of the sheets which are circulated on the circulation route are the same is described, the present embodiment is not limited to this case. For example, in a case where the respective paper sizes of all of the sheets which are circulated on the circulation route are different, the number of sheets M can be calculated from the sum of lengths of the respective sheets, or the number of sheets M can be calculated based on the maximum size. Moreover, instead of calculating the number of sheets M, table information such as that illustrated in FIG. 8 can be previously retained, so that the number of sheets M can be identified from the table information based on sizes of sheets to be supplied to the circulation route. Furthermore, here, the description proceeds assuming that M=4.

In step S403, the CPU 201 assigns "0" serving as an initial value to the setting value of the maximum value among the numbers of required circulations (hereinafter referred to as the maximum number of circulations pMAX) of sheets on which printing is to be performed based on the pieces of target data identified in step S402, and stores the maximum number of circulations pMAX in a memory such as the RAM 203. The number of circulations of a printed product refers to the number of times the printed product circulates on the circulation route provided in the image forming apparatus 100. Furthermore, as mentioned above, since circulatory conveyance of a sheet is repeated a number of times corresponding to the number of image layers to be formed on the sheet, the number of circulations of a given sheet corresponds to the number of image layers to be formed on the given sheet. While, at this time, the value of the maximum number of circulations pMAX is set to an initial value, as the processing described below is repeated, the finally updated setting value of the maximum number of circulations pMAX becomes corresponding to the maximum value among the numbers of required circulations of sheets on which printing is to be performed based on the pieces of target data identified in step S402.

In step S404, the CPU 201 identifies on which print data to perform the following repetitive processing among the pieces of target data identified in step S402. Specifically, the CPU 201 is assumed to identify print data used to perform printing on a sheet that is the i-th earliest in a sequence of discharging of sheets (hereinafter referred to as the "i-th sheet") among the pieces of target data identified in step S402. Therefore, in the case of performing the following repetitive processing in a sequence of discharging of sheets, the CPU 201 assigns "1" serving as an initial value to a reference number i. Moreover, when processing in step S404 is re-performed by repetition of the processing, the CPU 201 assigns a value obtained by adding "1" to the preceding assigned value to that preceding assigned value (performs increment). Furthermore, the sequence of discharging of sheets corresponds to a sequence in which sheets are discharged to a tray or trays, and is determined according to setting of a print job.

In step S405, the CPU 201 causes the image processing unit 207 to perform image processing on print data corresponding to the i-th sheet. At this time, in a case where, for example, three image layers are to be formed on the i-th sheet, the CPU 201 performs image processing three times in association with the respective image layers. While, in this configuration, image processing is performed for each piece of target data identified in step S402, a configuration in which, when a print job is received, image processing is collectively performed on all of the pieces of print data included in the print job can be employed. In that case, processing in step S405 is omitted.

In step S406, the CPU 201 identifies the number of image layers (pTmp[i]) to be formed on the i-th sheet.

In step S407, the CPU 201 determines whether the value of the number of image layers pTmp[i] is greater than the setting value of the maximum number of circulations pMAX currently stored. If it is determined that the number of image layers pTmp[i] is greater (YES in step S407), the CPU 201 then performs processing in step S408.

In step S408, the CPU 201 updates the setting value of the maximum number of circulations pMAX with the value of the number of image layers pTmp[i]. The CPU 201 is able to determine the maximum number of circulations pMAX of sheets on which printing is performed based on the pieces of target data, by repeating the processing in steps S404 to S408 a number of times corresponding to the number of pieces of target data. After repeating the processing in steps S404 to S408 a number of times corresponding to the number of pieces of target data, the CPU 201 advances the processing to step S409.

Next, in step S409, the CPU 201 starts generating a printing sequence list L[j], which is used to manage a printing sequence in the j-th circulatory conveyance. Furthermore, circulatory conveyance performed for one time refers to conveyance for circulating a sheet for one revolution in the circulation route provided in the image forming apparatus 100. Moreover, the printing sequence list L is a list used to manage a printing sequence of sheets, and is stored in a memory such as the RAM 203. The CPU 201 assigns "j=1" as an initial value. Furthermore, in a case where processing in step S409 is re-performed by repetition of processing, the CPU 201 assigns a value obtained by adding "1" to the preceding assigned value to that preceding assigned value (performs increment).

In step S410, the CPU 201 generates the printing sequence list L[j] to determine a printing sequence of sheets in the j-th conveyance. Details of step S410 are described below with reference to FIG. 5.

After that, the CPU 201 repeats the processing in steps S409 and S410 a number of times corresponding to the maximum number of circulations pMAX, thus generating a printing list for the number of circulations.

In step S411, the CPU 201 determines whether all of the pieces of print data corresponding to the input print job have been identified as pieces of target data. When determining that all of the pieces of print data corresponding to the input print job have been identified as pieces of target data (YES in step S411), the CPU 201 ends the processing. On the other hand, when not determining that all of the pieces of print data corresponding to the input print job have been identified as pieces of target data (NO in step S411), the CPU 201 returns the processing to step S402, in which, after identifying, as new target data, print data that is not yet identified as target data, the CPU 201 performs processing in step S403 and subsequent steps.

In step S412, the CPU 201 generates a printing sequence list L in such a way as to perform printing that is based on pieces of print data corresponding to the input print job in a sequence of discharging of sheets. This is because, in a case where the maximum number of image layers is not 2 or more, printing that is based on pieces of print data corresponding to the input print job is always one-side printing, in which the number of image layers is only "1". In other words, this is because, without performing special printing sequence control, printing is allowed to be performed in a sequence of discharging of sheets.

FIG. 5 is flowchart illustrating processing which the image forming apparatus 100 performs to determine a printing sequence of sheets on which printing is performed based on the input print job. Furthermore, the processing illustrated in this flowchart is implemented by the CPU 201 loading a control program stored in, for example, the ROM 202 or the HDD 204 included in the image forming apparatus 100 onto the RAM 203 and executing the control program. Moreover, the processing illustrated in this flowchart is processing corresponding to step S410 illustrated in FIG. 4. Here, a printing sequence list in the j-th circulation is generated.

In step S501, the CPU 201 assigns "1" serving as an initial value to rMAX[j]. rMAX[j] is the maximum value of the numbers of remaining required circulations of sheets referred to in processing in steps S503 to S511. The number of remaining required circulations of a given sheet is the number of circulations obtained by subtracting the number of times printing on the given sheet is performed in circulations before the j-th circulation from the number of required circulations of the given sheet. Here, since the processing in steps S503 to S511 is not yet performed, an initial value is assigned to rMAX[j].

In step S502, the CPU 201 assigns "0" serving as an initial value to sNUM. sNUM is the number of sheets referred to in the processing in steps S503 to S511. Here, since the processing in steps S503 to S511 is not yet performed, "0" serving as an initial value is assigned to sNUM.

In step S503, the CPU 201 identifies on which print data to perform the following repetitive processing among the pieces of target data identified in step S402. Specifically, the CPU 201 is assumed to identify print data used to perform printing on a sheet that is the k-th earliest in a sequence of discharging of sheets (hereinafter referred to as the "k-th sheet") among the pieces of target data identified in step S402. Therefore, in the case of performing the following repetitive processing in a sequence of discharging of sheets, the CPU 201 assigns "1" serving as an initial value to a reference number k. Moreover, when processing in step S404 is re-performed by repetition of the processing, the CPU 201 assigns a value obtained by adding "1" to the preceding assigned value to that preceding assigned value (performs increment). After that, the CPU 201 repeats the processing in steps S503 to S511 a number of times corresponding to the number of pieces of target data identified in step S402.

In step S504, the CPU 201 assigns the number of remaining required circulations of the k-th sheet to the number of circulations Tmp[j][k].

In step S505, the CPU 201 determines whether the number of circulations Tmp[j][k] is greater than rMAX[j]. When determining that the number of circulations Tmp[j][k] is greater (YES in step S505), the CPU 201 advances the processing to step S506, and, otherwise (NO in step S505), the CPU 201 advances the processing to step S510.

In step S506, the CPU 201 assigns the number of circulations Tmp[j][k] to rMAX[j].

In step S507, the CPU 201 deletes all of the pieces of sheet information that are added to the printing sequence list L[j]. In other words, sheets corresponding to pieces of sheet information that are already added to the printing sequence list L[j] are excluded from sheets targeted for printing in the j-th circulation.

In step S508, the CPU 201 adds sheet information corresponding to the k-th sheet to the printing sequence list L[j]. In other words, the k-th sheet serves as a sheet targeted for printing in the j-th circulation.

In step S509, the CPU 201 assigns a value obtained by adding "1" to the preceding assigned value to sNUM (performs increment).

On the other hand, in step S510, the CPU 201 determines whether the number of circulations Tmp[j][k] is equal to rMAX[j]. In a case where the number of circulations Tmp[j][k] is not equal to rMAX[j], in other words, in a case where the number of circulations Tmp[j][k] is less than rMAX[j], the k-th sheet is not subjected to printing in the j-th circulation, but is subjected to printing in the (j+1)-th or later circulation. Therefore, when determining that the number of circulations Tmp[j][k] is not equal to rMAX[j] (NO in step S510), the CPU 201 advances the processing to the end of a loop starting with step S503, without adding the k-th sheet to the printing sequence list L[j]. On the other hand, when determining that the number of circulations Tmp[j][k] is equal to rMAX[j] (YES in step S510), the CPU 201 advances the processing to step S508, in which the CPU 201 adds the k-th sheet to the printing sequence list L[j].

In step S511, the CPU 201 determines whether sNUM is equal to the number of pieces of target data identified in step S402. When determining that sNUM is equal to the number of pieces of target data identified in step S402 (YES in step S511), the CPU 201 ends the processing illustrated in the flowchart of FIG. 5 and then advances the processing to step S411, and, when determining that sNUM is not equal to the number of pieces of target data identified in step S402 (NO in step S511), the CPU 201 repeats the processing starting with step S503.

Figure 6A:
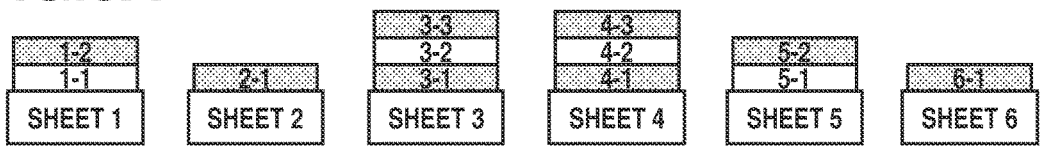
FIGS. 6A, 6B, 6C, 6D, 6E, 6F, and 6G are diagrams illustrating a method for determining a printing sequence list.

FIGS. 6A, 6B, 6C, 6D, 6E, 6F, and 6G are diagrams illustrating a method for determining a printing sequence list. Here, a printing sequence list of printed products corresponding to a print job A is assumed to be determined, and the print job A is assumed to be data corresponding to printed products of six sheets with a paper size of A4, as illustrated in FIG. 6A. Furthermore, on the first surface of the first sheet (sheet 1), a white special image layer is assumed to be printed as the first image layer and a CMYK image layer is assumed to be printed as the second image layer. Thus, the number of required circulations of the first sheet is 2. On the first surface of the second sheet (sheet 2), a CMYK image layer is assumed to be printed as the first image layer. Thus, the number of required circulations of the second sheet is 1. On the first surface of each of the third sheet (sheet 3) and the fourth sheet (sheet 4), a CMYK image layer is assumed to be printed as the first image layer, a white special image layer is assumed to be printed as the second image layer, and a CMYK image layer is also assumed to be printed as the third image layer. Thus, the number of required circulations of each of the third sheet and the fourth sheet is 3. On the first surface of the fifth sheet (sheet 5), a white special image layer is assumed to be printed as the first image layer and a CMYK image layer is assumed to be printed as the second image layer. Thus, the number of required circulations of the fifth sheet is 2. On the first surface of the sixth sheet (sheet 6), a CMYK image layer is assumed to be printed as the first image layer. Thus, the number of required circulations of the sixth sheet is 1.

In the present embodiment, since printing for one layer is performed with circulatory conveyance performed once, the maximum value of the number of required circulations of sheets corresponding to the print job A is 3. Furthermore, here, the number of sheets M that are able to be concurrently circulated on the circulation route is assumed to be 4.

Figure 6B:
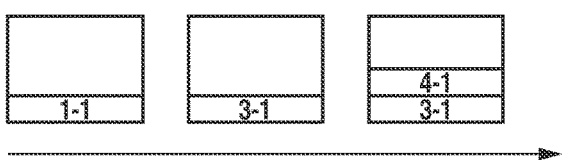

FIG. 6B illustrates a printing sequence list L in the first round of circulatory conveyance in processing of the print job A. Here, the b-th image layer on a sheet with a sheet number "a" is expressed as a sheet a-b. First of all, since the number of sheets M is 4, sheets 1 to 4 are selected as candidates to be added to the printing sequence list L (step S402). Next, a sheet 1-1 is added to the printing sequence list L.

Next, whether a sheet 2-1 is to be added to the printing sequence list L is determined. Here, the number of remaining required circulations of the sheet 2 is 1. Since the number of remaining required circulations of the sheet 2 is less than "2", which is the number of remaining required circulations of the sheet 1 already added to the printing sequence list L, the sheet 2-1 is not added to the printing sequence list L. This corresponds to processing proceeding via NO in step S505 and NO in step S510.

Next, whether a sheet 3-1 is to be added to the printing sequence list L is determined. Here, the number of remaining required circulations of the sheet 3 is 3. The number of remaining required circulations of the sheet 3 is greater than "2", which is the number of remaining required circulations of the sheet 1 already added to the printing sequence list L. Therefore, first, the sheet 1-1 is deleted from the printing sequence list L. After that, the sheet 3-1 is added to the printing sequence list L. This corresponds to processing proceeding via YES in step S505 and steps S506 to S508.

Next, whether a sheet 4-1 is to be added to the printing sequence list L is determined. Here, the number of remaining required circulations of the sheet 4 is 3. The number of remaining required circulations of the sheet 4 is equal to "3", which is the number of remaining required circulations of the sheet 3 already added to the printing sequence list L. Therefore, the sheet 4-1 is added to the printing sequence list L. This corresponds to processing proceeding via NO in step S505, YES in step S510, and step S508.

With such processing performed, in the first round of circulatory conveyance, the image forming apparatus 100 is able to perform printing on a sheet with the maximum number of required circulations in a sequence of discharging of sheets.

Figure 6C:
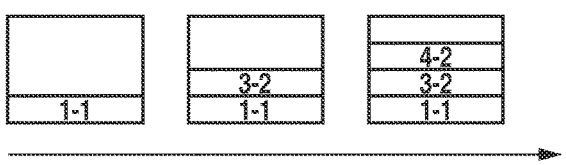

FIG. 6C illustrates a printing sequence list L in the second round of circulatory conveyance in processing of the print job A. First of all, the sheet 1-1 is added to the printing sequence list L.

Next, whether the sheet 2-1 is to be added to the printing sequence list L is determined. Here, the number of remaining required circulations of the sheet 2 is 1. Since the number of remaining required circulations of the sheet 2 is less than "2", which is the number of remaining required circulations of the sheet 1 already added to the printing sequence list L, the sheet 2-1 is not added to the printing sequence list L. This corresponds to processing proceeding via NO in step S505 and NO in step S510.

Next, since the sheet 3-1 is already added to the printing sequence list L, whether a sheet 3-2 is to be added to the printing sequence list L is determined. Here, the number of remaining required circulations of the sheet 3 is 2. The number of remaining required circulations of the sheet 3 is equal to "2", which is the number of remaining required circulations of the sheet 1 already added to the printing sequence list L. Therefore, the sheet 3-2 is added to the printing sequence list L. This corresponds to processing proceeding via NO in step S505, YES in step S510, and step S508.

Next, since the sheet 4-1 is already added to the printing sequence list L, whether a sheet 4-2 is to be added to the printing sequence list L is determined. Here, the number of remaining required circulations of the sheet 4 is 2. The number of remaining required circulations of the sheet 4 is equal to "2", which is the number of remaining required circulations of each of the sheets 1 and 3 already added to the printing sequence list L. Therefore, the sheet 4-2 is added to the printing sequence list L. This corresponds to processing proceeding via NO in step S505, YES in step S510, and step S508.

Figure 6D:
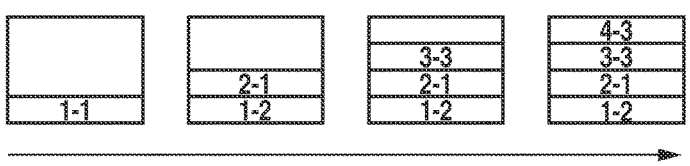

FIG. 6D illustrates a printing sequence list L in the third round of circulatory conveyance in processing of the print job A. Since the sheet 1-1 is already added to the printing sequence list L, first, a sheet 1-2 is added to the printing sequence list L.

Next, whether the sheet 2-1 is to be added to the printing sequence list L is determined. Here, the number of remaining required circulations of the sheet 2 is 1. The number of remaining required circulations of the sheet 2 is equal to "1", which is the number of remaining required circulations of the sheet 1 already added to the printing sequence list L. Therefore, the sheet 2-1 is added to the printing sequence list L. This corresponds to processing proceeding via NO in step S505, YES in step S510, and step S508.

Next, whether a sheet 3-3 is to be added to the printing sequence list L is determined. Here, the number of remaining required circulations of the sheet 3 is 1. The number of remaining required circulations of the sheet 3 is equal to "1", which is the number of remaining required circulations of each of the sheet 1 and 2 already added to the printing sequence list L. Therefore, the sheet 3-3 is added to the printing sequence list L. This corresponds to processing proceeding via NO in step S505, YES in step S510, and step S508.

Next, whether a sheet 4-3 is to be added to the printing sequence list L is determined. Here, the number of remaining required circulations of the sheet 4 is 1. The number of remaining required circulations of the sheet 4 is equal to "1", which is the number of remaining required circulations of each of the sheets 1 to 3 already added to the printing sequence list L. Therefore, the sheet 4-3 is added to the printing sequence list L. This corresponds to processing proceeding via NO in step S505, YES in step S510, and step S508.

With this, generation of the printing sequence list L that is based on the sheets 1 to 4 ends. After that, sheets 5 and 6 are selected as candidates of sheets to be added to the printing sequence list L (step S402).

Figure 6G:
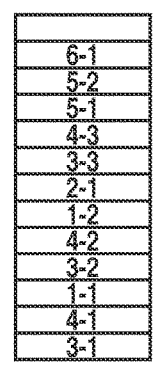
Figures 6E, 6F:
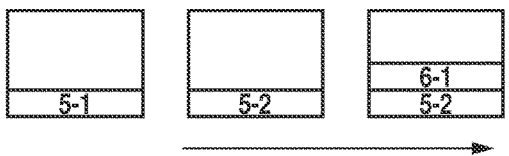

FIG. 6E illustrates a printing sequence list L in the fourth round of circulatory conveyance in processing of the print job A. First, a sheet 5-1 is added to the printing sequence list L.

Next, whether a sheet 6-1 is to be added to the printing sequence list L is determined. Here, the number of remaining required circulations of the sheet 6 is 1. Since the number of remaining required circulations of the sheet 6 is less than "2", which is the number of remaining required circulations of the sheet 5 already added to the printing sequence list L, the sheet 6-1 is not added to the printing sequence list L. This corresponds to processing proceeding via NO in step S505 and NO in step S510.

FIG. 6F illustrates a printing sequence list L in the fifth round of circulatory conveyance in processing of the print job A. Since the sheet 5-1 is already added to the printing sequence list L, first, a sheet 5-2 is added to the printing sequence list L.

Next, whether the sheet 6-1 is to be added to the printing sequence list L is determined. Here, the number of remaining required circulations of the sheet 6 is 1. The number of remaining required circulations of the sheet 6 is equal to "1", which is the number of remaining required circulations of the sheet 5 already added to the printing sequence list L. Therefore, the sheet 6-1 is added to the printing sequence list L. This corresponds to processing proceeding via NO in step S505, YES in step S510, and step S508.

In this way, the printing sequence lists in the respective rounds of circulatory conveyance are generated and are then integrated, so that, as a result, a printing sequence list in the processing of the print job A is generated as illustrated in FIG. 6G. Furthermore, while, in the above description, printing is performed on the sheets 1 to 6 based on a single print job A, for example, as long as a plurality of print jobs is already received, printing can be performed on the sheets 1 to 6 based on the plurality of print jobs. However, even in such a case, the printing sequence list is generated as illustrated in FIG. 6G.

Furthermore, as illustrated in FIGS. 6A to 6G, printing may be performed on the sheet 2 after printing is performed on the sheet 1 and the sheet 3. In this case, after the sheet 1 and the sheet 3 are conveyed onto the conveyance route and printing is performed on the sheet 1 and the sheet 3, the sheet 2 can be inserted into the conveyance route between the sheet 1 and the sheet 3.

When completing generation of the printing sequence list in the above-described way, the CPU 201 performs supplying of sheets to the circulation route and printing based on the generated printing sequence list.

With printing that is based on a printing sequence list illustrated in FIG. 6G taken as an example, printing that is based on the printing sequence list is described.

First, on the basis of the printing sequence list in the first round of circulatory conveyance, the sheet 3 and the sheet 4 are supplied to the circulation route and the respective first image layers are formed on the sheet 3 and the sheet 4.

Subsequently, on the basis of the printing sequence list in the second round of circulatory conveyance, before the respective second image layers are formed on the sheet 3 and the sheet 4, the sheet 1 is supplied to the position more downstream than the sheet 3 and the sheet 4 in the conveyance direction. Then, the first image layer is formed on the sheet 1 and the respective second image layers are formed on the sheet 3 and the sheet 4.

Subsequently, on the basis of the printing sequence list in the third round of circulatory conveyance, the second image layer is formed on the sheet 1. Then, before the respective third image layers are formed on the sheet 3 and the sheet 4, the sheet 2 is supplied to the position more upstream than the sheet 1 and more downstream than the sheet 3 and the sheet 4 in the conveyance direction. Then, the first image layer is formed on the sheet 2 and the respective third image layers are formed on the sheet 3 and the sheet 4. With this, since forming the image layers on the sheets 1 to 4 is completed, the sheets 1 to 4 are discharged to a discharge destination.

Subsequently, on the basis of the printing sequence list in the fourth round of circulatory conveyance, the sheet 5 is conveyed to the circulation route, and the first image layer is formed on the sheet 5.

Subsequently, on the basis of the printing sequence list in the fifth round of circulatory conveyance, the second image layer is formed on the sheet 5. Then, the sheet 6 is supplied to the position more upstream than the sheet 5 in the conveyance direction, and the first image layer is formed on the sheet 6.

With this configuration employed, while sheets are discharged based on the sheet numbers, printing for forming a plurality of image layers can be performed without allowing sheets to wastefully circulate in the circulation route.

Furthermore, when printing is performed based on the printing sequence list generated in the above-described way, printed products are discharged to a discharge destination face-up (in a position with the printing-complete surface upwards in vertical direction) in ascending order of page number. However, the CPU 201 can perform control to discharge printed products face-down (in a position with the printing-complete surface downwards in vertical direction). In the case of discharging printed products face-down in ascending order of page number, the CPU 201 performs control to re-convey the printed products in the circulation route after completion of printing and invert the directions of surfaces of the respective printed products by the inversion unit 113, then discharging the printed products to a discharge destination.

Furthermore, in a case where printed products are discharged to a discharge destination face-up, the printed products may be discharged in descending order of page number. Therefore, in the above description, pieces of print data are sequentially identified as target data in step S402 starting with print data corresponding to a sheet with a smaller page number, but, in a case where printed products are discharged to a discharge destination face-up, pieces of print data can be sequentially identified as target data starting with print data corresponding to a sheet with a larger page number. Then, while, in the above-described embodiment, during generation of a printing sequence list, sheets are sequentially added to the printing sequence list starting with a sheet with a smaller page number, sheets can be sequentially added to the printing sequence list starting with a sheet with a larger page number. In other words, if the number of image layers to be formed is the same, printing can be performed on sheets starting with a sheet with a larger page number.

Furthermore, whether to discharge printed products to a discharge destination face-up or discharge printed products to a discharge destination face-down can be optionally set by the user. For example, the user can add, to setting information included in a print job, information indicating whether to discharge printed products to a discharge destination face-up or discharge printed products to a discharge destination face-down. Moreover, for example, the user can set, as apparatus setting of the image forming apparatus 100, whether to discharge printed products to a discharge destination face-up or discharge printed products to a discharge destination face-down. Therefore, the CPU 201 can set, based on the above-mentioned setting, whether to discharge printed products to a discharge destination face-up or discharge printed products to a discharge destination face-down, and can switch whether to invert the printed products after completion of printing or a method of generating a printing sequence list based on the identified method of discharging.

Figure 7A:
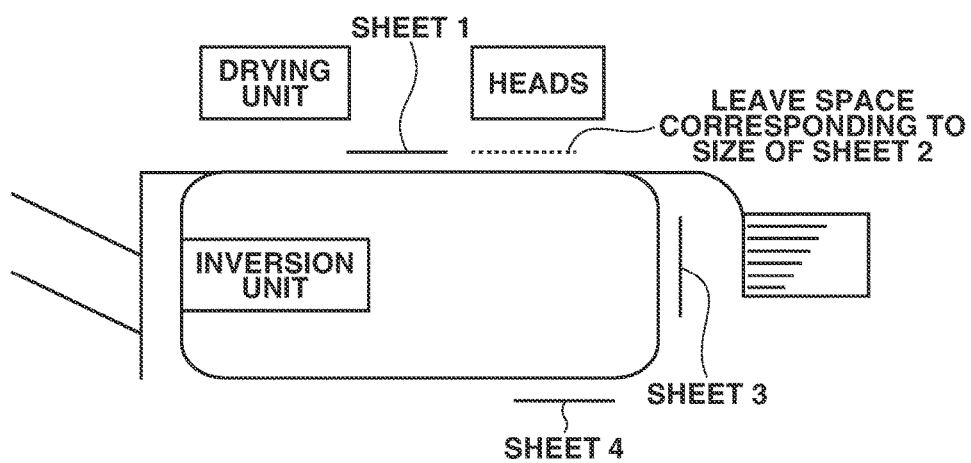
FIGS. 7A and 7B are diagrams illustrating cross-sections of a conveyance route taken when, after a printing sequence list is generated in a way such as that illustrated in FIGS. 6A to 6G, the second round of circulatory printing is performed based on the generated printing sequence list.
Figure 7B:
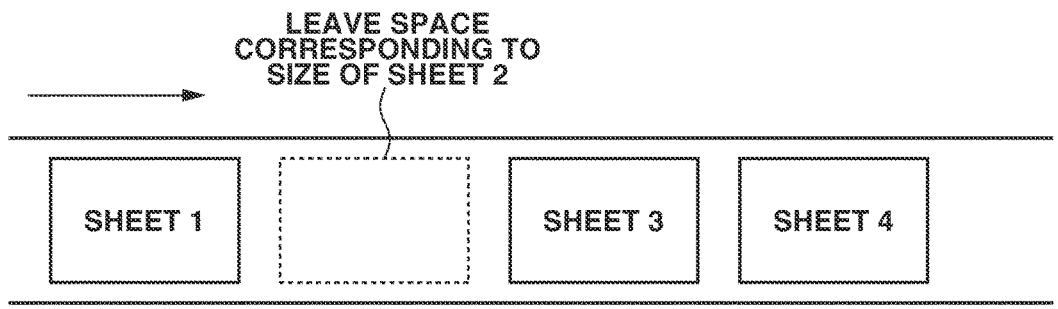

FIG. 7A is a diagram illustrating a cross-section of a conveyance route taken when the second round of circulatory printing is performed based on a printing sequence list after the printing sequence list is generated as illustrated in FIGS. 6A to 6G. FIG. 7B is a diagram schematically illustrating a state of the conveyance route taken when the second round of circulatory printing is performed based on a printing sequence list after the printing sequence list is generated as illustrated in FIGS. 6A to 6G. Since printing is not performed on the sheet 2 after the sheet 1, the sheet 1 is inserted into the conveyance route in such a manner that a space corresponding to the size of the sheet 2 is left in front of the sheet 3. Then, when the second round of circulatory printing is performed, the sheet 2 is inserted into the space that is left in the above-mentioned way. In this way, in comparison with a configuration in which the sheet 2 is inserted into the conveyance route from the first round of circulatory printing, the number of times of drying the sheet 2 by the drying unit 112 can be reduced, so that an influence of drying on the sheet 2 can be reduced. The method of leaving a space includes a method of temporarily stopping conveyance of the sheet 3 and the sheet 4 following the sheet 1 to cause the sheet 3 and the sheet 4 to wait and a method of feeding the sheet 1 in consideration of a space corresponding to the size of the sheet 2, but either of them can be employed.

Figure 9:
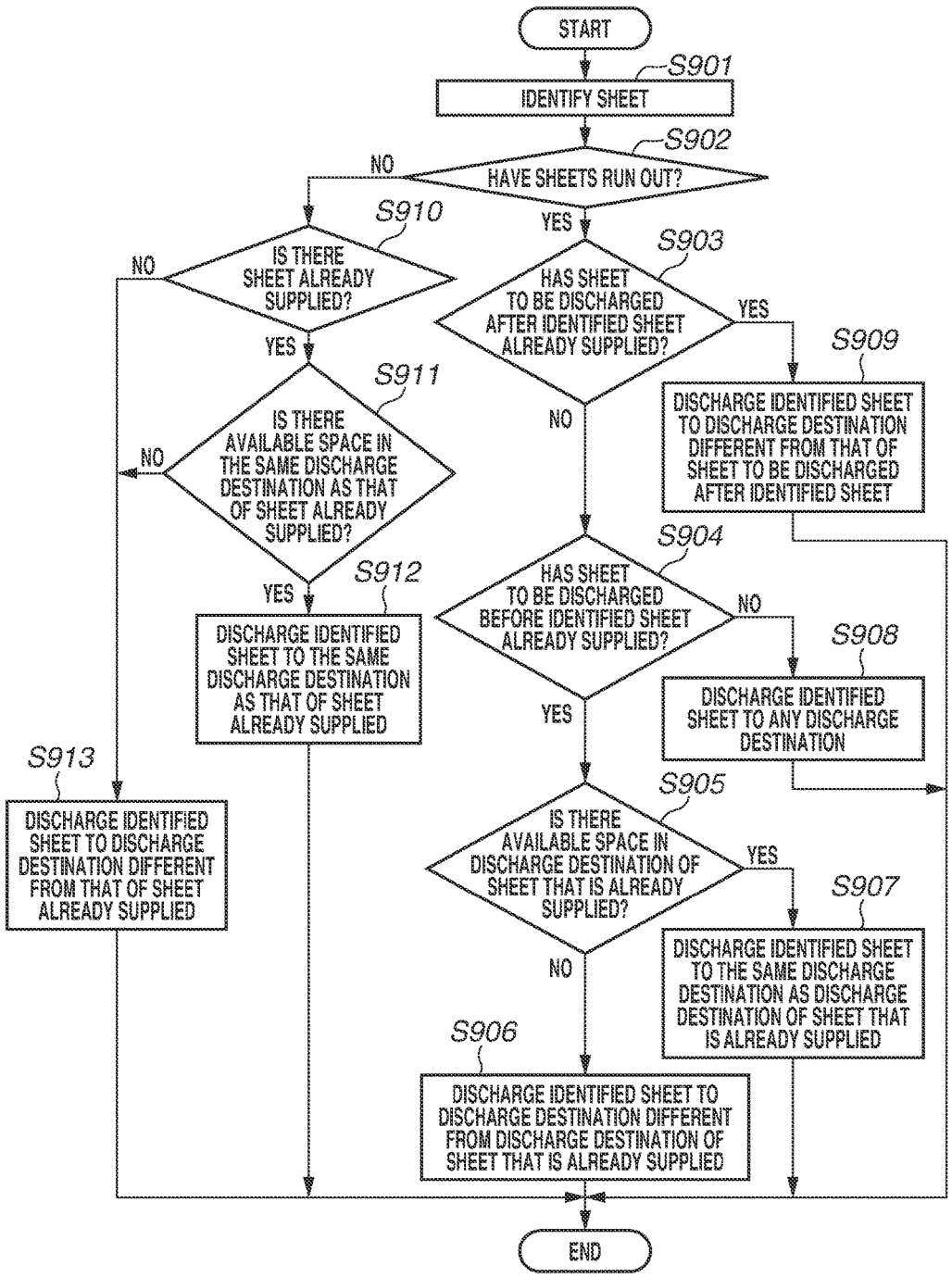
FIG. 9 is a flowchart illustrating processing which the image forming apparatus performs to determine a discharge destination of sheets.

FIG. 9 is a flowchart illustrating processing which the image forming apparatus 100 performs to determine a discharge destination of a sheet. Furthermore, the processing illustrated in this flowchart is implemented by the CPU 201 loading a control program stored in, for example, the ROM 202 or the HDD 204 included in the image forming apparatus 100 onto the RAM 203 and executing the control program. Moreover, the processing illustrated in this flowchart is started when circulatory printing has been performed based on a printing sequence list generated as illustrated in FIG. 5, and is performed for each sheet before the sheet is supplied to the circulation route.

In step S901, the CPU 201 identifies a sheet on which printing is performed based on any print data among sheets on which printing is performed based on a print job received by the image forming apparatus 100, as a sheet to be supplied to the circulation route. Here, the CPU 201 is assumed to identify a sheet on which printing is performed based on print data A (hereinafter referred to as a "sheet A"), as a sheet to be supplied to the circulation route.

In step S902, the CPU 201 determines whether sheets contained in the sheet feeding cassette unit 101 have run out halfway through printing. If sheets have run out, it becomes impossible to supply the sheet A to the circulation route. When determining that sheets contained in the sheet feeding cassette unit 101 have run out halfway through printing (YES in step S902), the CPU 201 advances the processing to step S903, and, when determining that sheets contained in the sheet feeding cassette unit 101 have not run out halfway through printing (NO in step S902), the CPU 201 advances the processing to step S910.

In step S903, the CPU 201 determines whether a sheet the sheet number of which follows that of the sheet A and which is to be discharged after the sheet A (hereinafter referred to as a "later-stage sheet") has already been supplied to the circulation route. When determining that the later-stage sheet has already been supplied to the circulation route (YES in step S903), the CPU 201 advances the processing to step S909, and, when not determining that the later-stage sheet has already been supplied to the circulation route (NO in step S903), the CPU 201 advances the processing to step S904. For example, in a case where printing is performed in conformity with a printing sequence list such as that illustrated in FIG. 6G, a sheet with sheet number 3 is supplied to the circulation route prior to a sheet with sheet number 1. Therefore, for example, in a case where the sheet with sheet number 1 is the sheet A, the result of determination in step S903 is YES. On the other hand, in a case where a sheet with sheet number 3 in the first round of circulation or a sheet with sheet number 4 in the first or later round of circulation is the sheet A, the result of determination in step S903 is NO.

In step S909, the CPU 201 identifies discharging the sheet A to a discharge destination different from the discharge destination of the later-stage sheet. In a case where the later-stage sheet has already been supplied to the circulation route, before sheets are supplied and the sheet A is supplied to the circulation route, printing on the later-stage sheet is completed and the later-stage sheet is discharged to any discharge destination. If the sheet A is discharged to that discharge destination, the alignment sequence of the discharged sheets reverses. Therefore, in the present embodiment, in step S909, the CPU 201 identifies discharging the sheet A to a discharge destination different from the discharge destination of the later-stage sheet.

In step S904, the CPU 201 determines whether a sheet the sheet number of which precedes that of the sheet A and which is to be discharged before the sheet A (hereinafter referred to as an "earlier-stage sheet") has already been supplied to the circulation route. When determining that the earlier-stage sheet has already been supplied to the circulation route (YES in step S904), the CPU 201 advances the processing to step S905, and, when not determining that the earlier-stage sheet has already been supplied to the circulation route (NO in step S904), the CPU 201 advances the processing to step S908.

In step S908, the CPU 201 identifies discharging the sheet A to any discharge destination in which there is an available space to which the sheet A is discharged.

In step S905, the CPU 201 determines whether there is an available space to which the sheet A is discharged in the discharge destination of the earlier-stage sheet. When determining that there is no available space (NO in step S905), the CPU 201 advances the processing to step S906, and, when determining that there is an available space (YES in step S905), the CPU 201 advances the processing to step S907.

In step S906, the CPU 201 identifies discharging the sheet A to a discharge destination which is different from the discharge destination of the earlier-stage sheet and in which there is an available space to which the sheet A is discharged.

In step S907, the CPU 201 identifies discharging the sheet A to the discharge destination of the earlier-stage sheet.

In step S910, the CPU 201 determines whether there is a sheet already supplied to the circulation route. When determining that there is a sheet already supplied to the circulation route (YES in step S910), the CPU 201 advances the processing to step S911, and, when determining that there is no sheet already supplied to the circulation route (NO in step S910), the CPU 201 advances the processing to step S913.

In step S911, the CPU 201 determines whether there is an available space to which the sheet A is discharged in the discharge destination of the sheet already supplied to the circulation route. When determining that there is an available space (YES in step S911), the CPU 201 advances the processing to step S912, and, when determining that there is no available space (NO in step S911), the CPU 201 advances the processing to step S913.

In step S912, the CPU 201 identifies discharging the sheet A to the discharge destination of the sheet already supplied to the circulation route.

In step S913, the CPU 201 identifies discharging the sheet A to a discharge destination which is different from the discharge destination of the sheet already supplied to the circulation route and in which there is an available space to which the sheet A is discharged.

After the discharge destination of the sheet A is identified, the CPU 201 once ends the processing, and, when another sheet is supplied to the circulation route, the CPU 201 performs processing illustrated in the present flowchart. Furthermore, after the discharge destination of the sheet A is identified, when sheets are supplied and printing on the sheet A is resumed, the CPU 201 performs control to discharge the sheet A to the identified discharge destination.

Furthermore, the method of identifying the discharge destination of a sheet is not limited to the above-mentioned configuration, but, for example, the discharge destination of a sheet can be identified in such a manner that only sheets on which printing has been performed based on the same print job are discharged to one discharge destination.

The above-described embodiment can also be implemented by processing which supplies a program for implementing one or more functions of the above-described embodiment to a system or apparatus via a network or a storage medium and causes one or more processors included in the system or apparatus to execute the program. Moreover, the above-described embodiment can also be implemented by a circuit which implements one or more functions (for example, an application specific integrated circuit (ASIC)).

According to one embodiment, printing on a plurality of recording media including a recording medium on which three or more image layers are formed can be appropriately executed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-089518 filed Apr. 28, 2017, which is hereby incorporated by reference herein in its entirety.

What is claimed is:

1. An image forming apparatus to form one or a plurality of image layers on a plurality of recording media including a first recording medium on which a first number of image layers are formed and a second recording medium on which a second number of image layers are formed, wherein the second number is larger than the first number by two or more, the image forming apparatus comprising:
at least one processor configured to control:
a reception unit configured to receive a print job,
a conveyance unit configured to sequentially convey recording media included in the plurality of recording media to a recording position used to form an image layer on a recording medium,
an image forming unit configured to form, each time a recording medium is conveyed to the recording position, one image layer on the recording medium conveyed to the recording position based on the print job,
a re-conveyance unit configured to re-convey, to the recording position, a recording medium having one or a plurality of image layers formed on the re-conveyed recording medium, and
a discharge unit configured to discharge, to a discharge destination in a sequence of discharging that is based on one or a plurality of print jobs each corresponding to the print job, a recording medium or media having an image layer or layers completely formed on the media,
wherein, regardless of the sequence of discharging, the second recording medium is conveyed to the recording position prior to the first recording medium, and
wherein, in a case where a number of remaining image layers to be formed on the second recording medium having one or more image layers already formed on the second recording medium and a number of remaining image layers to be formed on the first recording medium having no image layer yet formed on the first recording medium are equal to each other, the first recording medium is conveyed to the recording position.

2. The image forming apparatus according to claim 1, wherein, in a case where the first recording medium is discharged to the discharge destination prior to the second recording medium, the first recording medium is conveyed to the recording position before the second recording medium is re-conveyed to the recording position.

3. The image forming apparatus according to claim 1, wherein the at least one processor is further configured to control a drying unit configured to dry an image layer formed on each of the plurality of recording media, and
wherein a recording medium having a dried image layer formed the recording medium is re-conveyed to the recording position.

4. The image forming apparatus according to claim 1, wherein the at least one processor is further configured to control a holding unit, and
wherein, in a case where, after the second recording medium is conveyed to the recording position, the holding unit is configured to hold a recording medium to be conveyed to the recording position does not hold a recording medium, so that, before the first recording medium, which is earlier in the sequence of discharging than the second recording medium, is conveyed to the recording position, formation of an image layer or layers on the second recording medium is completed, the second recording medium is controlled to be discharged earlier than the first recording medium, and the first recording medium is controlled to be discharged to a discharge destination different from a discharge destination to which the second recording medium has been discharged.

5. The image forming apparatus according to claim 1, wherein the at least one processor is further configured to control an inversion unit configured to invert directions of surfaces of a recording medium, and
wherein, after directions of surfaces of a recording medium having an image layer or layers completely formed on the recording medium are inverted, the recording medium having the image layer or layers completely formed on the recording media is discharged to a discharge destination.

6. The image forming apparatus according to claim 1, wherein the at least one processor is further configured to control an inversion unit configured to invert directions of surfaces of a recording medium,
wherein, in a case where the plurality of recording media is discharged to a discharge destination while surfaces having one or a plurality of image layers formed on the surfaces of the plurality of recording media are positioned downwards in vertical direction, control is performed such that:
the plurality of recording media having the image layer or layers completely formed on the media is sequentially discharged to the discharge destination starting with a recording medium having a smaller page number that is based on one or a plurality of print jobs each corresponding to the print job and, after directions of surfaces of the plurality of recording media having the image layer or layers completely formed on the media are inverted, the plurality of recording media having the image layer or layers completely formed on the media is discharged to the discharge destination, and
an image layer is formed on the second recording medium prior to the first recording medium, wherein the second recording medium has a first page number and the first recording medium has a page number smaller than the page number of the second recording medium, and
wherein, in a case where the plurality of recording media is discharged to the discharge destination while surfaces having one or a plurality of image layers formed on the surfaces of the plurality of recording media are positioned upwards in vertical direction, control is performed such that:
the plurality of recording media having the image layer or layers completely formed on the media is sequentially discharged to the discharge destination starting with a recording medium having a larger page number that is based on one or a plurality of print jobs each corresponding to the print job, and
an image layer is formed on the second recording medium prior to the first recording medium, wherein the second recording medium has the first page number and the first recording medium has a page number larger than the page number of the second recording medium.

7. The image forming apparatus according to claim 1, wherein ink is ejected on a recording medium conveyed to the recording position so that an image layer is formed on the recording medium conveyed to the recording position.

8. The image forming apparatus according to claim 1, wherein the plurality of recording media further includes a third recording medium on which a third number of image layers are formed, wherein the third number is larger than the first number and smaller than the second number, wherein, regardless of the sequence of discharging, the second recording medium is conveyed to the recording position prior to the first recording medium and the third recording medium, wherein, in a case where a number of remaining image layers to be formed on the second recording medium having one or more image layers already formed on the second recording medium and a number of remaining image layers to be formed on the third recording medium having no image layer yet formed on the third recording medium are equal to each other, the third recording medium is conveyed to the recording position, and wherein, in a case where a number of remaining image layers to be formed on the second recording medium having one or more image layers already formed on the second recording medium, a number of remaining image layers to be formed on the third recording medium having one or more image layers already formed on the third recording medium, and a number of remaining image layers to be formed on the first recording medium having no image layer yet formed on the first recording medium are equal to each other, the first recording medium is conveyed to the recording position.

9. The image forming apparatus according to claim 1, wherein the at least one processor is further configured to control a drying unit configured to, before a recording medium having one or a plurality of image layers formed on the re-conveyed recording medium is re-conveyed to the recording position, perform processing for drying the one or the plurality of image layers formed on the recording medium.

10. A control method for an image forming apparatus to form one or a plurality of image layers on a plurality of recording media including a first recording medium on which a first number of image layers are formed and a second recording medium on which a second number of image layers are formed, wherein the second number is larger than the first number by two or more, the control method comprising:

receiving a print job;

sequentially conveying recording media included in the plurality of recording media to a recording position used to form an image layer on a recording medium;

forming, each time a recording medium is conveyed to the recording position, one image layer on the recording medium conveyed to the recording position based on the print job;

re-conveying, to the recording position, a recording medium having one or a plurality of image layers formed on the re-conveyed recording medium; and discharging, to a discharge destination in a sequence of discharging that is based on one or a plurality of print jobs each corresponding to the print job, a recording medium or media having an image layer or layers completely formed on the media, wherein, regardless of the sequence of discharging, the second recording medium is conveyed to the recording position prior to the first recording medium, and wherein, in a case where a number of remaining image layers to be formed on the second recording medium having one or more image layers already formed on the second recording medium and a number of remaining image layers to be formed on the first recording medium having no image layer yet formed on the first recording medium are equal to each other, the first recording medium is conveyed to the recording position.

11. The control method according to claim 10, wherein, in a case where the first recording medium is discharged to the discharge destination prior to the second recording medium, the first recording medium is conveyed to the recording position before the second recording medium is re-conveyed to the recording position.

12. The control method according to claim 10, further comprising drying an image layer formed on each of the plurality of recording media, wherein a recording medium having a dried image layer formed the recording medium is re-conveyed to the recording position.

13. The control method according to claim 10, further comprising holding, in a case where, after the second recording medium is conveyed to the recording position, a recording medium to be conveyed to the recording position does not hold a recording medium, so that, before the first recording medium, which is earlier in the sequence of discharging than the second recording medium, is conveyed to the recording position, formation of an image layer or layers on the second recording medium is completed, the second recording medium is controlled to be discharged earlier than the first recording medium, and the first recording medium is controlled to be discharged to a discharge destination different from a discharge destination to which the second recording medium has been discharged.

14. The control method according to claim 10, further comprising inverting directions of surfaces of a recording medium, wherein, after directions of surfaces of a recording medium having an image layer or layers completely formed on the recording medium are inverted, the recording medium having the image layer or layers completely formed on the recording media is discharged to a discharge destination.

15. The control method according to claim 10, further comprising inverting directions of surfaces of a recording medium, wherein, in a case where the plurality of recording media is discharged to a discharge destination while surfaces having one or a plurality of image layers formed on the surfaces of the plurality of recording media are positioned downwards in vertical direction, control is performed such that:

the plurality of recording media having the image layer or layers completely formed on the media is sequentially discharged to the discharge destination starting with a recording medium having a smaller page number that is based on one or a plurality of print jobs each corresponding to the print job and, after directions of surfaces of the plurality of recording media having the image layer or layers completely formed on the media are inverted, the plurality of recording media having the image layer or layers completely formed on the media is discharged to the discharge destination, and an image layer is formed on the second recording medium prior to the first recording medium, wherein the second recording medium has a first page number and the first recording medium has a page number smaller than the page number of the second recording medium, and wherein, in a case where the plurality of recording media is discharged to the discharge destination while surfaces having one or a plurality of image layers formed on the surfaces of the plurality of recording media are positioned upwards in vertical direction, control is performed such that:

the plurality of recording media having the image layer or layers completely formed on the media is sequentially discharged to the discharge destination starting with a recording medium having a larger page number that is based on one or a plurality of print jobs each corresponding to the print job, and an image layer is formed on the second recording medium prior to the first recording medium, wherein the second recording medium has the first page number and the first recording medium has a page number larger than the page number of the second recording medium.

16. The control method according to claim 10, wherein ink is ejected on a recording medium conveyed to the recording position so that an image layer is formed on the recording medium conveyed to the recording position.

17. The control method according to claim 10, wherein the plurality of recording media further includes a third recording medium on which a third number of image layers are formed, wherein the third number is larger than the first number and smaller than the second number, wherein, regardless of the sequence of discharging, the second recording medium is conveyed to the recording position prior to the first recording medium and the third recording medium, wherein, in a case where a number of remaining image layers to be formed on the second recording medium having one or more image layers already formed on the second recording medium and a number of remaining image layers to be formed on the third recording medium having no image layer yet formed on the third recording medium are equal to each other, the third recording medium is conveyed to the recording position, and wherein, in a case where a number of remaining image layers to be formed on the second recording medium having one or more image layers already formed on the second recording medium, a number of remaining image layers to be formed on the third recording medium having one or more image layers already formed on the third recording medium, and a number of remaining image layers to be formed on the first recording medium having no image layer yet formed on the first recording medium are equal to each other, the first recording medium is conveyed to the recording position.

18. A non-transitory computer-readable storage medium storing computer-executable instructions that, when executed by a computer, cause the computer to perform a control method for an image forming apparatus to form one or a plurality of image layers on a plurality of recording media including a first recording medium on which a first number of image layers are formed and a second recording medium on which a second number of image layers are formed, wherein the second number is larger than the first number by two or more, the control method comprising:

receiving a print job;

sequentially conveying recording media included in the plurality of recording media to a recording position used to form an image layer on a recording medium;

forming, each time a recording medium is conveyed to the recording position, one image layer on the recording medium conveyed to the recording position based on the print job;

re-conveying, to the recording position, a recording medium having one or a plurality of image layers formed on the re-conveyed recording medium; and discharging, to a discharge destination in a sequence of discharging that is based on one or a plurality of print jobs each corresponding to the print job, a recording medium or media having an image layer or layers completely formed on the media, wherein, regardless of the sequence of discharging, the second recording medium is conveyed to the recording position prior to the first recording medium, and wherein, in a case where a number of remaining image layers to be formed on the second recording medium having one or more image layers already formed on the second recording medium and a number of remaining image layers to be formed on the first recording medium having no image layer yet formed on the first recording medium are equal to each other, the first recording medium is conveyed to the recording position.

* * * * *